May 6, 1941.     D. G. SMELLIE     2,241,166
REFRIGERATION
Filed Aug. 17, 1939     2 Sheets-Sheet 1

INVENTOR
Donald G. Smellie
BY Harry S. Dunars
ATTORNEY

May 6, 1941.  D. G. SMELLIE  2,241,166
REFRIGERATION
Filed Aug. 17, 1939   2 Sheets-Sheet 2

INVENTOR
Donald G. Smellie
BY
Harry S. Dumars
ATTORNEY

Patented May 6, 1941

2,241,166

UNITED STATES PATENT OFFICE 2,241,166

REFRIGERATION

Donald G. Smellie, Canton, Ohio, assignor to The Hoover Company, North Canton, Ohio, a corporation of Ohio Application August 17, 1939, Serial No. 290,578

10 Claims. (Cl. 62—5)

This invention relates to the art of absorption refrigerating systems and more particularly to a novel three-fluid absorption refrigerating apparatus so constructed and arranged that the system automatically compensates itself for variations in operating conditions to maintain efficient operating characteristics of the system.

Heretofore it has been common in the art of three-fluid absorption refrigerating apparatus to provide the apparatus with some auxiliary means which will compensate the same for changes induced by variations in atmospheric temperature conditions. This was necessary because of the fact that an increase in atmospheric temperature; that is, an increase in the temperature of the cooling air, decreases the ability of the absorber to remove refrigerant vapor from the pressure equalizing medium refrigerant vapor mixture supplied thereto. As a consequence of this decrease in the efficiency of the absorber, the lean gas which is returned to the evaporator has an increased refrigerant vapor concentration which thereby decreases the ability of the lean gas to pick up refrigerant vapor from the liquid supplied to the evaporator. Since less refrigerant can evaporate into a given quantity of the inert gas, the capacity of the system is decreased and operating conditions are far from satisfactory and efficient.

Accordingly it is a principal object of the present invention to provide a mechanism whereby the rate at which the absorption solution is circulated is automatically increased proportionately to changes in atmospheric temperature conditions whereby the refrigerant vapor content of the rich gas supplied to the absorber is more efficiently removed therefrom and the refrigerant vapor concentration of the lean gas is held within desired limits.

It is a still further object of the present invention to provide a three-fluid absorption refrigerating apparatus of the inert gas type utilizing a power driven inert gas circulating fan and a gas lift pump for circulating the absorption solution in which means are provided for varying the pressure of the pumping gas supplied to the circulating pump in order to regulate the capacity of the system by controlling the rate of absorption solution circulation.

It is a still further object of the present invention to provide a three-fluid absorption refrigerating system of the type in which the absorption solution is circulated by a gas lift pump including a mechanism constructed and arranged to modulate the pressure to which certain portions of the solution circuit are subjected thereby to alter liquid levels therein and consequently the rate at which the absorption solution is circulated therethrough.

Other and further objects of the invention will become apparent as the description proceeds when taken in connection with the accompanying drawings in which.

Figure 1:
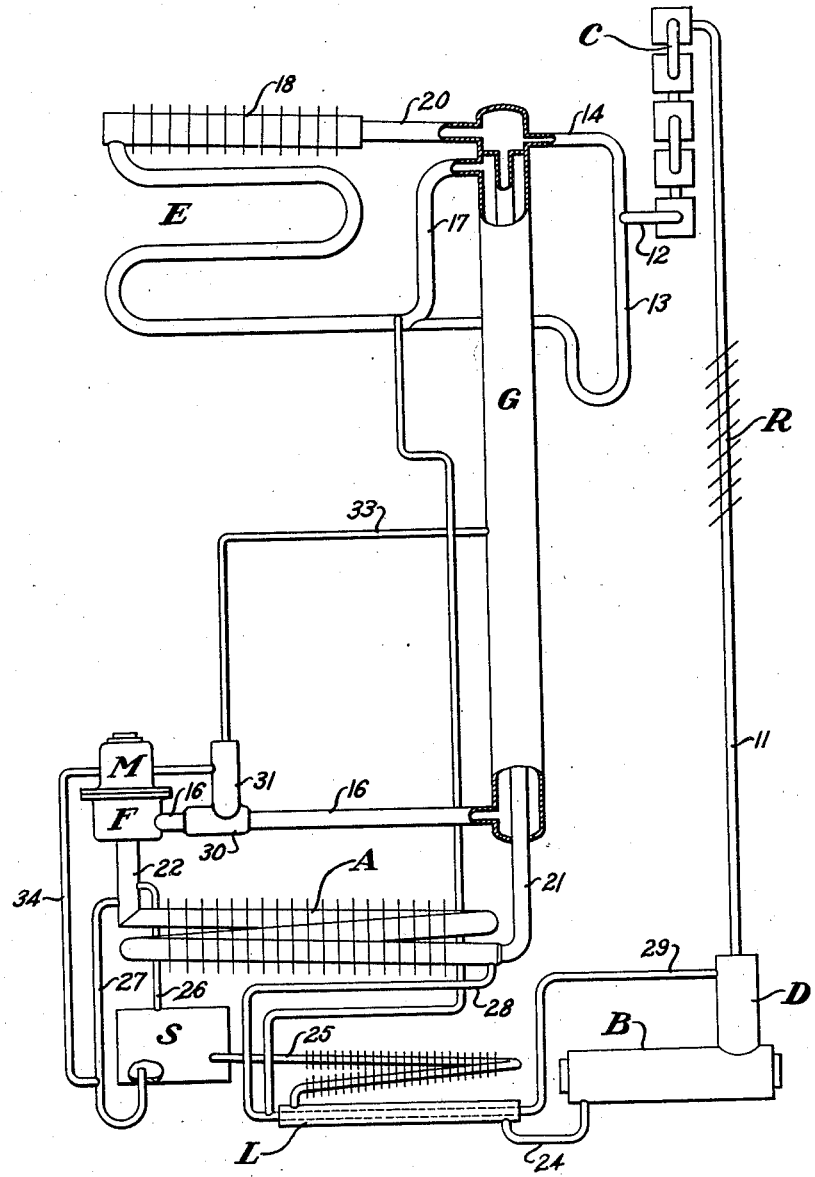
Figure 1 is a diagrammatic representation of a three-fluid absorption refrigerating apparatus embodying the present invention.
Figure 2:
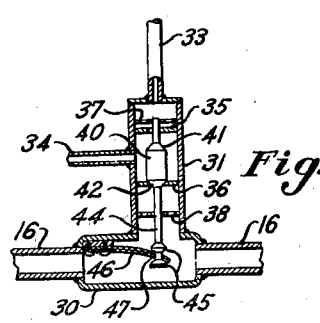
Figure 2 is a partial sectional elevational view of a detail drawn on an enlarged scale.

Referring now to the drawings in detail and first to Figures 1 and 2 thereof, there is illustrated a continuously operating type of three-fluid absorption refrigerating system embodying a boiler B, an analyzer D, an air-cooled rectifier R, a tubular air-cooled condenser C, an evaporator E, a gas heat exchanger G, a liquid heat exchanger L, a solution reservoir S, a tubular air-cooled absorber A and a circulating fan F which is driven by an electrical motor M. The above mentioned elements are suitably interconnected by various conduits to form a plurality of gas and liquid circuits constituting a complete refrigerating system to which reference will be made in more detail hereinafter.

The above described refrigerating system will be charged with a suitable refrigerant, such as ammonia, a suitable absorbent therefor, such as water, and a pressure equalizing medium preferably a dense inert gas like nitrogen.

The boiler B may be heated in any suitable or desired manner as by an electrical cartridge heater or a combustible fuel burner.

A suitable control mechanism, not shown, will be provided to regulate the heating of the boiler and the operation of the circulating motor M in response to evaporator temperature conditions or the temperature of the space to be refrigerated as may be desired. A preferred form of control mechanism is disclosed and claimed in the copending application of Curtis C. Coons, Serial No. 148,424, filed June 16, 1937.

The application of heat to the boiler B generates refrigerant vapor from the strong solution normally therein contained. The vapor so generated passes upwardly through the analyzer D in counterflow relation to the strong solution flowing downwardly therethrough. The vapor which is thus passed through the analyzer is then conveyed therefrom into the upper portion of the condenser C by means of the conduit 11 which includes the rectifier R.

The refrigerant vapor is liquefied in the condenser by heat exchange with atmospheric air and is conveyed therefrom to the bottom portion of the evaporator E by means of the conduit 12 and the conduit 13 which includes a U-shaped portion extending downwardly to a level below the bottom portion of the evaporator E. The condenser side of the U-shaped conduit 13 is vented by means of a conduit 14 to the rich gas side of the gas heat exchanger G.

The liquid refrigerant supplied to the bottom portion of the evaporator E by means of the conduit 13 meets a high velocity stream of the inert gas which is supplied from the circulating fan F by way of the conduit 16, the outer path of the gas heat exchanger G and a conduit 17.

The liquid refrigerant is propelled upwardly through the evaporator as it is evaporating thereinto to produce refrigeration. The upper portion of the evaporator comprises an enlarged diameter finned box-cooling section 18 through which the liquid refrigerant is propelled by the inert gas supplied to the lower portion of the evaporator. The rich gas produced in the evaporator is conveyed therefrom into the rich gas side of the gas heat exchanger by means of conduit 20.

The evaporator E has been shown only diagrammatically herein. It may take any desired or preferred form. A preferred construction of an evaporator of the type in which the inert gas propels the liquid refrigerant upwardly therethrough is disclosed and claimed in the co-pending application of Curtis C. Coons and William H. Kitto, Serial No. 220,189, filed July 20, 1938. However, if desired, the evaporator E may be of the conventional gravity flow type.

The rich gas which is discharged from the upper portion of the evaporator into the inner path of the gas heat exchanger G is conveyed therefrom to the bottom portion of the absorber A by way of the conduit 21.

The rich gas flows upwardly through the absorber A in counterflow relationship with weak solution flowing downwardly therethrough. Refrigerant vapor is absorbed by the absorbing solution from the rich gas and the resulting heat of absorption is rejected to cooling air flowing over the exterior walls of the absorber conduit and the fins mounted thereon. The resulting lean gas is conveyed from the upper portion of the absorber A into the suction side of the circulating fan F by way of the conduit 22, thus completing the inert gas circuit.

The lean solution which is produced in the boiler B by the generation of refrigerant vapor therefrom is conveyed to the solution reservoir S by way of the conduit 24, the liquid heat exchanger L, and a looped finned solution precooling conduit 25.

The upper portion of the solution reservoir S is vented to the suction conduit 22 of the circulating fan by way of a conduit 26. The solution which is supplied to the reservoir is elevated therefrom into the fan suction conduit 22 adjacent its point of connection with the absorber A by means of the gas lift pump conduit 27. Pumping gas is supplied to the conduit 27 in a manner to be described hereinafter. For the present it is sufficient to note that the conduit 27 functions with a gas lift pump to convey the lean solution into the upper portion of the absorber A.

The lean solution which is supplied to the upper end of the absorber A flows downwardly therethrough by gravity in counterflow relationship with the rich gas flowing upwardly therethrough as previously described. The rich solution formed in the absorber A is conveyed from the bottom portion thereof to the upper portion of the analyzer D by way of the conduit 28, the liquid heat exchanger L, and a conduit 29, thus completing the absorption solution circuit.

A valve housing sleeve 30 is interposed in the discharge conduit 16 of the fan and adjacent the fan. An upstanding cylindrical valve casing 31 is attached to the upper side of the sleeve 30. The upper portion of the sleeve 31 communicates with the lean gas side of the gas heat exchanger G approximately midway of its length by means of a conduit 33. A gas supply conduit 34 for the gas lift pumping conduit 27 is connected between the mid point of the casing 31 and to the conduit 27 below the liquid level normally therein contained.

The casing 31 is provided with a pair of valve port plates 35 and 36 above and below, respectively, the level at which the conduit 34 communicates with the interior of the casing 31. A perforated valve stem guide plate 37 is rigidly mounted in the casing 31 above the valve port plate 35 and a similar plate 38 is rigidly mounted in the casing 31 below the valve port plate 36.

A valve plug element 40 is mounted within the casing 31 between the plates 35 and 36 and is provided on its opposite ends with tapered portions 41 and 42 which are adapted to seat in the valve plates 35 and 36, respectively. A valve stem 44 passes through the valve plug element 40 and is journaled in the plates 37 and 38, thereby to provide a guideway for the valve plug 40. The lower end of the valve stem 44 is provided with a pair of spaced bearing projections 45. A bimetallic thermostatic element 46 is rigidly attached to the inner wall of the casing 30 and is provided with a bifurcated end 47 which receives the portion of the stem 44 between the protuberance 45 whereby movement of the bimetallic thermostat will cause corresponding movement of the valve plug 40.

The valve plug 40 is so proportioned that the valve port in either of the plates 35 and 36 will be fully opened only when the opposite port is fully closed. In any intermediate position the valve plug 40 will throttle both the ports in the valve plates 35 and 36. It is apparent that the portion of the casing directly housing the valve plug 40 is open to the conduits 33 and 16 through the perforated guide plates 37 and 38 and the ports in the plates 35 and 36.

The operation of this form of the invention is as follows: Under the lowest temperature conditions likely to be encountered in actual operation of the system the temperature of the inert gas discharged from the absorber will be at a minimum value as will the temperature of the gas which is discharged through the circulating fan into the sleeve 30. The low temperature gas will flex the bimetallic thermostat 46 downwardly into the position illustrated in Figure 2 thereby preventing communication between the conduits 16 and 34 and allowing substantially free communication between the conduits 33 and 34.

Under these circumstances the inert gas supplied to the circulating pump 27 will be at a pressure equal to the discharge pressure of the circulating fan less the resistance drop between the discharge port of the circulating fan F and the point of connection between the conduit 33 and the gas heat exchanger G. The pressure of the inert gas being at its minimum value, the solution will circulate through the absorption solution circuit at a minimum rate but one which will be amply sufficient to maintain the efficiency and capacity of the apparatus under the atmospheric conditions then prevailing.

As the temperature of the cooling air increases, the temperature of the inert gas which is passing through the sleeve 30 will also increase. Increasing temperature of the gases flowing through the sleeve 30 will gradually flex the thermostat 46 upwardly as viewed in Figure 2 to thereby throttle the connection between the central portion of the casing 31 and the conduits 16 and 33.

Under these conditions the pressure of the inert gas supplied to the conduit 34 will be some differential between the pressures prevailing in the conduits 33 and 16, and the rate at which the inert gas circulates will be greater than that at which it circulates under lowest temperature conditions.

Assume now that the temperature of the cooling air rises to its practical maximum value. Under these conditions the temperature of the inert gas discharged into the conduit 16 and flowing through the sleeve 30 will be at its practical maximum value and will cause the thermostat 46 to flex upwardly, as viewed in Figure 2, to a position to seat the valve element 41 in the port in the valve plate 35 thereby completely interrupting communication between the conduits 33 and 34. The pressure of the inert gas supplied to the conduit 27 through the conduit 34 will now be at its maximum value, namely the discharge pressure of the circulating fan F and will circulate the solution through the absorption solution circuit at its maximum rate in order to compensate the system for the decreased ability of the absorption solution to remove the refrigerant vapor from the inert gas due to the relatively high temperature conditions prevailing in the absorber.

Under high temperature operation the rate at which the absorption solution circulates is at a maximum, though the concentration of the rich solution has decreased. This, however, is compensated by the fact that the solution is circulated through the boiler at a greater rate.

The conduit 33 may be connected to any portion of the inert gas circuit normally at a pressure lower than that prevailing in the conduit 16. For small domestic refrigerating units it is preferred to connect the conduit 33 to some port in the inert gas circuit at a pressure approximately $\frac{3}{16}"$ of water lower than that prevailing in the conduit 16, thereby permitting a total variation in pressure of the inert gas supplied to the circulating fan of a matter of $\frac{3}{16}"$ of water which is sufficient to give proper regulation of the circulation of the absorption solution through the whole range of temperatures normally to be encountered in operation of domestic refrigerating apparatus.

Figure 3:
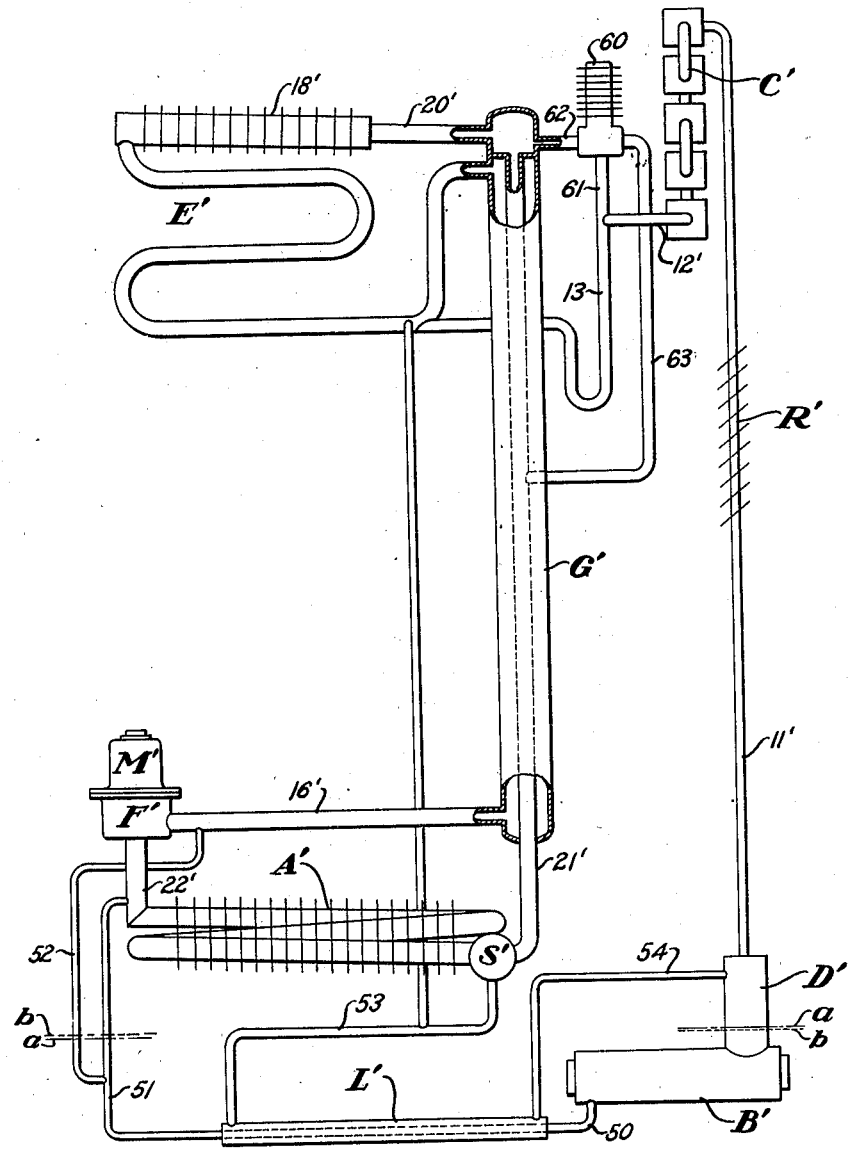
Figure 3 is a diagrammatic representation of a three-fluid absorption refrigerating apparatus embodying a modified form of the invention.
Figure 4:
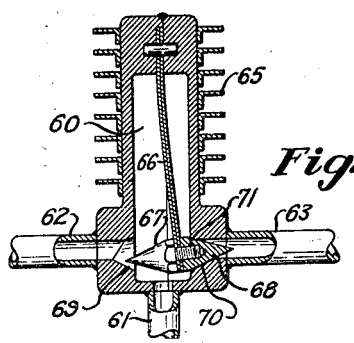
Figure 4 is a partial sectional elevational view drawn to an enlarged scale of a detail of the mechanism of Figure 3.

Referring now to Figures 3 and 4 there is disclosed a modified form of the invention. This form of the invention contains many elements and arrangements identical with those illustrated and described in connection with Figures 1 and 2 and they are given the same reference characters primed.

In this form of the invention the weak solution formed in the boiler by the generation of refrigerant vapor is conveyed therefrom by way of the conduit 50, the liquid heat exchanger L', and a gas lift pumping conduit 51 which is supplied with pumping gas by means of the conduit 52 connected between the discharge conduit 16' of the circulating fan F' and the conduit 51 normally below the liquid level therein contained. The lean solution is thus elevated into the upper portion of the absorber A' by gas lift action and flows therethrough by gravity in counterflow relationship with the rich mixture of refrigerant vapor and pressure equalizing medium.

The rich solution formed in the absorber flows to the bottom portion thereof and into the reservoir S' from which it is conveyed to the upper portion of the analyzer D' by way of the conduit 53, the liquid heat exchanger L' and the conduit 54.

The condenser side of the conduits 13' is vented to the bottom central portion of a valve chamber 60 by means of a conduit 61. The left hand side of the bottom portion of the valve chamber 60, as viewed in Figure 3, is vented to the rich gas side of the gas heat exchanger G' by means of a conduit 62. The right hand side of the chamber 60, as viewed in Figure 3, is vented by means of a conduit 63 to an intermediate portion of the inner or rich gas path of the gas heat exchanger G'. Due to the resistance of the gas heat exchanger there is a pressure differential of approximately $\frac{3}{16}"$ of water between the conduits 62 and 63.

The interior construction of the valve chamber 60 and its connecting conduits is illustrated very clearly in Figure 4. The chamber 60 is provided exteriorly thereof with a plurality of heat radiating fins 65. A bimetallic thermostat 66 is mounted within the chamber 60 and is secured thereto at its upper end. The lower free end of the bimetallic thermostat 66 is positioned between the facing inlets of the conduits 62 and 63 and carries on opposite sides thereof valve plug elements 67 and 68 which are adapted to seat in valve ports 69 and 70, respectively, governing the flow of fluids through the conduits 62 and 63, respectively.

As shown, the valve plug 67 carries a threaded projection 71 which extends through an opening in the bimetallic thermostat 66 and threadedly engages the valve plug 68 whereby the plugs 67 and 68 are clamped on opposite sides of the thermostat 66.

The valve plugs and associated valve seats are so proportioned that each valve port will be fully opened only when the opposite valve port is fully closed and in all intermediate positions of the valve there will be a throttling effect through each port whereby the pressure to which the conduit 61 is subjected will be some differential of the pressures prevailing in the conduits 62 and 63.

The pressure prevailing in the conduit 61 is applied to the liquid in the boiler analyzer system through the conduit 12', the condenser C' and the conduit 11'. Since the lean solution line of the solution circuit is always subjected to the suction pressure of the circulating fan, a change in pressure in conduit 61 will produce a corresponding change in liquid levels in the solution circuit and will therefore alter the depth of immersion of the pump 51 or the effective head against which it operates. For present purposes the depth of immersion of the circulating pump may be defined as the distance between the free surface of the liquid therein under static conditions and the points at which the pumping gas conduit 52 connects with the pumping conduit 51.

Since the pressure of the pumping gas supplied to the conduit 51 is constant, the rate of solution circulation is a function of the depth of immersion of the pump and will be a minimum when that depth of immersion is at its minimum value and vice versa.

The operation of this form of the invention is as follows: Assuming that the apparatus is operating with the ambient temperature at the lowest value likely to be encountered in normal operation of the system, the bimetallic thermostat 66 will have flexed to the left, as viewed in Figure 2, to subject the conduit 61 to the minimum pressure prevailing in its local circuit, namely that prevailing in the conduit 63.

Since the pressure to which the liquid in the boiler-analyzer is subjected is at its minimum value, the liquid level therein is at its maximum value and corresponds approximately to the line marked $a$. Under these conditions the depth of immersion of the circulating gas lift pump is at its minimum value as the liquid level therein under static conditions would correspond approximately to the level of the line marked $a$. The rate of solution circulation is at a minimum value when the depth of immersion is at a minimum value and this minimum value is designed to provide adequate solution circulation when the cooling air temperature is low.

As the temperature of the cooling air rises, the temperature of the thermostat 66 increases therewith due to the action of the fins 65 and gradually shifts the valve elements 67 and 68 to the right, as viewed in Figure 4, thereby permitting the pressure in the conduit 62 to exercise greater and greater influence upon the conduit 61 with a corresponding decrease in the influence by the conduit 63. This produces a gradual decrease in the liquid level in the boiler-analyzer system due to the increasing back pressure thereon coupled with a consequent gradual rise in the liquid level in the conduit 51.

As the effective pre-liquid level in the conduit 51 rises the depth of immersion of the pump increases and the rate of solution circulation correspondingly increases. Eventually, assuming that temperature conditions reach a maximum normally to be expected in operation of the apparatus, the bimetallic thermostat 66 will have flexed to the extreme right, as viewed in Figure 4, wherefore the pressure in the conduit 61 will be substantially that prevailing in the conduit 62 which is the maximum pressure to which the boiler-analyzer system is subjected. Under these conditions the liquid level in the boiler-analyzer system will have decreased to the dotted lines marked $b$ and the liquid level in the conduit 51 will have increased to the dotted line marked $b$, thereby providing a maximum depth of immersion of the circulating pump and a maximum rate of circulation of the absorption solution through its circuit.

Consequently the rate at which the absorption solution is circulated is a direct function of the ambient temperature wherefore the system is automatically compensated for changes in ambient temperature by altering the rate at which the solution circulates through the apparatus in order to maintain the capacity and operating efficiency thereof at all times.

Therefore, in accordance with each form of the invention the operating characteristics of the apparatus are altered to compensate the same for changes induced by variations in operating conditions, namely the temperature of the cooling air by variably and selectively subjecting selected portions of the solution circuit to a differential of the pressure difference existing between various portions of the gas heat exchanger.

In accordance with each form of the invention the rate of solution circulation is increased with increasing atmospheric temperature conditions in order to maintain the absorbing capacity of the absorber whereby the inert gas which is returned to the evaporator is sufficiently lean to promote efficient and complete evaporation of the liquid refrigerant supplied thereto.

While the invention is disclosed herein in considerable detail, various changes may be made in the arrangement, construction and proportion of the parts without departing from the spirit of the invention or the scope of the appended claims.

I claim:

1. Absorption refrigerating apparatus comprising an inert gas circuit including an evaporator and an absorber, an absorption solution circuit including a generator and said absorber, a gas heat exchanger in said inert gas circuit connected between said absorber and said evaporator, means for propelling an inert gas through said inert gas circuit, a circulating pump in said absorption solution circuit for circulating absorption solution therethrough, and thermostatic means for subjecting a selected area of said absorption solution circuit to a pressure which varies between the pressures prevailing within a selected portion of said gas heat exchanger and the pressure prevailing in a portion of said inert gas circuit external to said gas heat exchanger.

2. Absorption refrigerating apparatus comprising an inert gas circuit including an evaporator and an absorber, an absorption solution circuit including a generator and said absorber, a gas heat exchanger in said inert gas circuit connected between said absorber and said evaporator, means for propelling an inert gas through said inert gas circuit, a circulating pump in said absorption solution circuit for circulating absorption solution therethrough, means for liquefying refrigerant vapor produced in said generator and for supplying the liquid to said evaporator, a valve casing having an outlet and a pair of inlets, means connecting said outlet to a portion of the apparatus in open communication with said absorption solution circuit, means connecting one of said inlets to said gas heat exchanger, means connecting the other of said inlets to another portion of said inert gas circuit, valve means in said casing for controlling said inlets, and thermostatic means for actuating said valve means in accordance with a temperature condition affecting the operation of the system.

3. Absorption refrigerating apparatus comprising an inert gas circuit including an evaporator and an absorber, a solution circuit including a generator and said absorber, means for liquefying refrigerant vapor liberated in said generator and for supplying the liquid to said evaporator, power driven means for propelling the inert gas through said inert gas circuit, means forming a pressure balancing liquid column between said generator and liquefying means and said evaporator, a circulating pump in said solution circuit, and means responsive to a condition affecting the operation of the system for varying the pressure applied to the generator side of said pressure balancing means between the pressures prevailing in two parts of said inert gas circuit.

4. Absorption refrigerating apparatus comprising an inert gas circuit including an evaporator and an absorber, a solution circuit including a generator and said absorber, means for liquefying refrigerant vapor liberated in said generator and for supplying the liquid to said evaporator, power driven means for propelling the inert gas through said inert gas circuit, a gas lift pump included in said solution circuit for circulating the absorbing solution therethrough, and means responsive to an operating condition of the system for displacing a quantity of solution proportional to such operating condition from said generator into said gas lift pump to alter the depth of immersion thereof.

5. Absorption refrigerating apparatus comprising an inert gas circuit including an evaporator and an absorber, a solution circuit including a generator and said absorber, means for liquefying refrigerant vapor liberated in said generator and for supplying the liquid to said evaporator, power driven means for propelling the inert gas through said insert gas circuit, a gas lift pump included in said solution circuit for circulating the absorbing solution therethrough, and means responsive to a condition affecting the operation of the system for subjecting said generator to a pressure which varies between the pressures prevailing in two separated portions of said inert gas circuit, whereby to control the liquid levels in said solution circuit and the effective head against which said pump operates.

6. Absorption refrigerating apparatus comprising an inert gas circuit including an evaporator and an absorber, a solution circuit including a generator and said absorber, means for liquefying refrigerant vapor liberated in said generator and for supplying the liquid to said evaporator, power driven means for propelling the inert gas through said inert gas circuit, a gas lift circulating pump in said solution circuit including means for supplying pumping gas thereto from said inert gas circuit, said last mentioned means including means for controlling the pressure of such pumping gas in accordance with an operating condition of the system.

7. Absorption refrigerating apparatus comprising an inert gas circuit including an evaporator and an absorber, a solution circuit including a generator and said absorber, means for liquefying refrigerant vapor liberated in said generator and for supplying the liquid to said evaporator, power driven means for propelling the inert gas through said inert gas circuit, a gas lift circulating pump in said solution circuit including means for supplying pumping gas thereto from said inert gas circuit, said last mentioned means including a control chamber connected to the discharge side of said inert gas circulator and to a portion of said inert gas circuit normally at a lower pressure than the discharge side of said inert gas circulator, means for conveying pumping gas from said chamber to said gas lift pump, and temperature responsive means for controlling the degree of communication between said chamber and said connections to the discharge side of said inert gas circulator and said other portion of said inert gas circuit to vary the pressure of the pumping gas in accordance with the ambient temperature.

8. Absorption refrigerating apparatus comprising an inert gas circuit including an evaporator and an absorber, a solution circuit including a generator and said absorber, means for liquefying refrigerant vapor liberated in said generator and for supplying the liquid to said evaporator, power driven means for propelling the inert gas through said inert gas circuit, a gas lift pump in said solution circuit for circulating the absorption solution therethrough, and means responsive to ambient temperature conditions for supplying pumping gas from said inert gas circuit to said gas lift pump at a pressure which varies with ambient temperature between the pressures prevailing in selected areas of said inert gas circuit.

9. Absorption refrigerating apparatus comprising an inert gas circuit including an evaporator and an absorber, a solution circuit including a generator and said absorber, means for liquefying refrigerant vapor liberated in said generator and for supplying the liquid to said evaporator, power driven means for propelling the inert gas through said inert gas circuit, a gas lift pump in said solution circuit for circulating the absorption solution therethrough, and means responsive to ambient temperature conditions for subjecting said generator to a pressure which varies with ambient temperature conditions between the pressures prevailing in selected areas of said inert gas circuit to regulate the liquid levels in said solution circuit and thereby to vary the depth of immersion of said gas lift pump.

10. Absorption refrigerating apparatus comprising an inert gas circuit including an evaporator and an absorber, a solution circuit including a generator and said absorber, means for liquefying refrigerant vapor liberated in said generator and for supplying the liquid to said evaporator, a circulating pump in said solution circuit for circulating solution therethrough, and means responsive to an operating condition of the apparatus for displacing solution from said generator to said pump to alter the effective head against which said pump operates in accordance with such condition.

DONALD G. SMELLIE.